United States Patent [19]
Ream

[11] 3,978,946
[45] Sept. 7, 1976

[54] PARKING BRAKE SYSTEM WITH TRANSMISSION INTERLOCK

[75] Inventor: Michael D. Ream, Lafayette, Calif.

[73] Assignee: Caterpillar Tractor Co., Peoria, Ill.

[22] Filed: Sept. 19, 1974

[21] Appl. No.: 507,265

[52] U.S. Cl. .............................. 192/4 A; 192/13 R; 188/170; 251/26
[51] Int. Cl.² ........................................ B60K 29/02
[58] Field of Search ........................... 192/4 A, 13 R

[56] References Cited
UNITED STATES PATENTS

| | | | |
|---|---|---|---|
| 3,565,220 | 2/1971 | Lammers | 192/13 R |
| 3,589,484 | 6/1971 | Lammers | 192/13 R |
| 3,635,317 | 1/1972 | Crabb | 192/4 A |
| 3,774,736 | 11/1973 | Ito et al. | 192/4 A |
| 3,837,449 | 9/1974 | Drone | 192/4 C |
| 3,854,559 | 12/1974 | Talak et al. | 192/4 A |

Primary Examiner—Benjamin W. Wyche
Attorney, Agent, or Firm—Phillips, Moore, Weissenberger, Lempio & Strabala

[57] ABSTRACT

A parking brake system with transmission interlock means is provided with means to override the interlock means. The parking brake system is spring-actuated and fluid pressure released with means to vent the transmission controls when the parking brake is engaged. A special interlock valve is provided to selectively override the normal system to prevent venting of the transmission.

3 Claims, 4 Drawing Figures

3,978,946

PARKING BRAKE SYSTEM WITH TRANSMISSION INTERLOCK

BACKGROUND OF THE INVENTION

The present invention relates to a parking brake system with transmission interlock and pertains particularly to a control system that automatically vents transmission control pressure when the parking brake is engaged.

Large heavy-duty vehicles, such as earth-working vehicles, are normally provided with parking brake systems that automatically engage when the vehicle engine is shut down and transmission control pressure is permitted to leak down. These systems are normally constructed such as to combine the parking brake with the service brake system. The parking brake is normally spring-applied and fluid pressure released. Thus the parking brake is normally engaged and remains engaged until sufficient control pressure is developed within the system to disengage the parking brakes. One problem with such vehicles, however, is that the engine capacity is such as to be able to move the vehicle with the parking brakes engaged. Such movement, however, could severely damage the brake system.

Most systems are provided with some form of warning means such as buzzers or flashing lights to warn the operator that the brakes are still engaged. However, should such a warning system fail, the operator may forget to disengage the parking brake and thus drive the vehicle off and damage the parking brakes and consequently the service brakes such as to make them essentially non-workable There are times, however, when it would be advantageous to be able to move the vehicle such as to a shop or other service area if brake pressure is lost. This cannot generally be accomplished with known prior art systems.

SUMMARY AND OBJECTS OF THE INVENTION

It is the primary object of the present invention to overcome the above disadvantages of the prior art.

Another object of the present invention is to provide an interlock system operative to automatically vent transmission control pressure when the parking brakes are engaged in order to prevent damage to the brakes.

Another object of the present invention is to provide an interlock control system operative to vent transmission controls when the parking brakes are engaged and including means for overriding the vent means at the operator's option.

In accordance with a primary aspect of the present invention there is provided an interlock valve means that is operative to vent transmission control pressure when the parking brakes are engaged. The interlock valve includes means for overriding the vent means at the election of the vehicle operator. The interlock means includes pressure-responsive means responsive to an auxiliary source of fluid should the main vehicle pressure fail for controlling the interlock overriding means.

BRIEF DESCRIPTION OF THE DRAWINGS

The above and other objects and advantages of the invention will become apparent from the following specification when taken in conjunction with the accompanying drawings, wherein.

DETAILED DESCRIPTION OF PREFERRED EMBODIMENT

Figure 1:
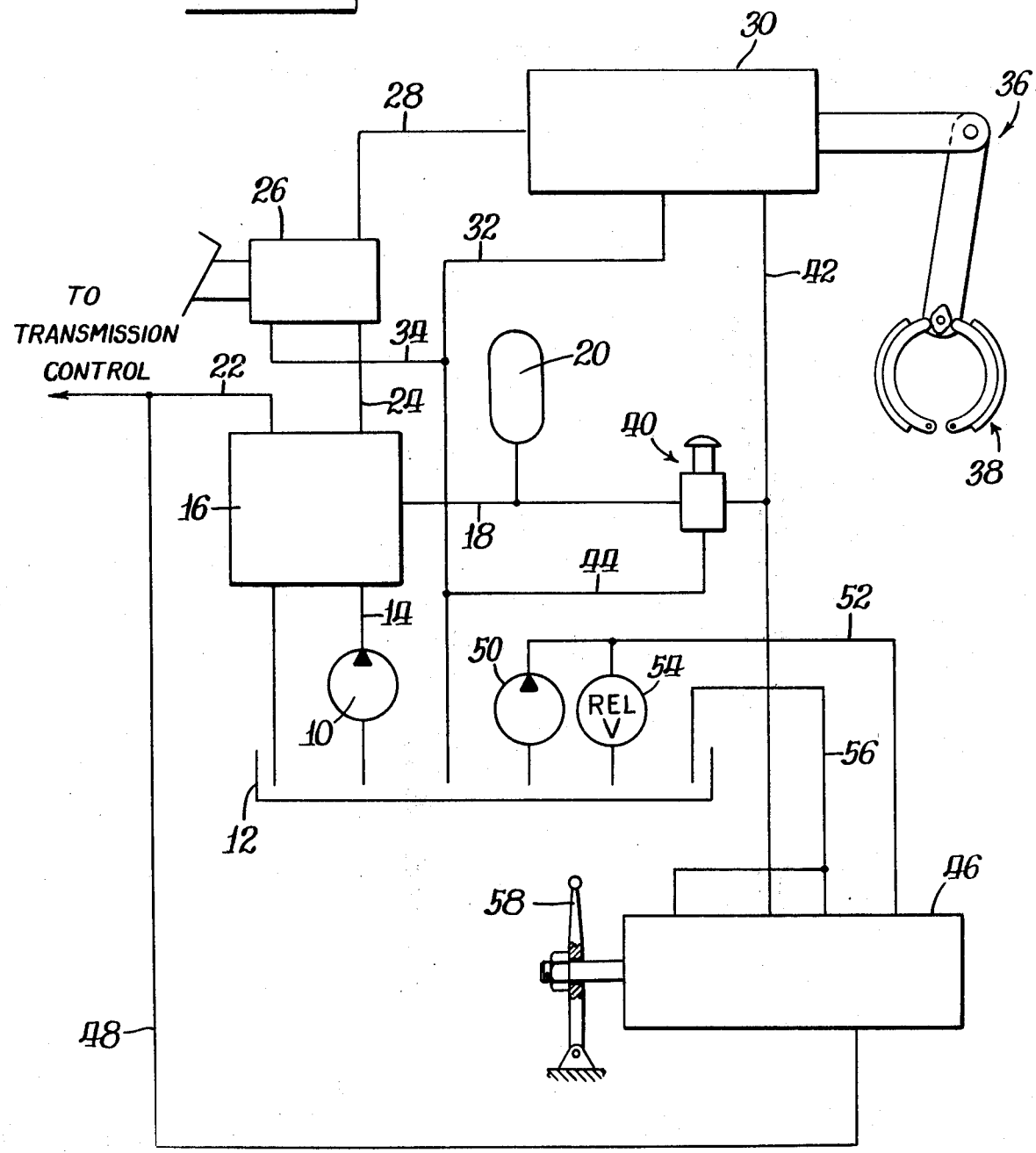
FIG. 1 is a schematic layout of a brake control system incorporating the present invention.

Referring now to FIG. 1, there is illustrated a brake control system, comprising a first pump 10 driven by the vehicle engine and operative to draw hydraulic fluid from a sump or reservoir 12 and supply it under pressure by way of conduit means 14 to an accumulator charging valve 16. Pressurized fluid from pump 10 passes through charging valve 16 to conduit means 18 where it is communicated to an accumulator 20. The fluid is also directed from valve 16 to conduit means 22 by which it is supplied to the control system of a hydraulically controlled transmission not shown. Another conduit 24 is operative to communicate fluid from valve 16 to a service brake control valve 26, which may be either lever- or pedal-operated and is operative to direct fluid along conduit means 28 to a brake-actuator 30 for operation of the service brakes. A return line 32 communicates return fluid from actuator 30 and from valve 26 by line 34 to sump or reservoir 12.

The actuator 30 is operatively connected through suitable linkage means 36 for operation or engagement of suitable brake shoes or bands 38 which may be of any suitable conventional design and function both as service brakes and as parking or emergency brake.

The actuator 30 may be of any suitable design but preferably includes a double-acting piston connected to the linkage of the brake assembly and including a compression spring (not shown) biasing the piston in a direction to engage the brakes to act as parking brakes. The piston is preferably mounted within a cylindrical chamber and includes suitable ports or openings for the introduction of pressurized fluid for movement of the piston to the engaged and nonengaged position of the brakes.

The parking brakes are controlled by means of a valve 40 which is preferably a two-position valve and may be referred to as on-off valve. The valve 40 is operative to direct fluid communicated thereto by conduit 18 by way of conduit 40 to the actuator assembly 30 for moving the actuator to the disengaged position. The valve 40 is operative in a second position to vent fluid from the actuator by way of conduit 44 to return line 32, where it returns to sump 12. Simultaneously with the venting of the actuator 30 the valve blocks the flow of fluid from conduit 18 to conduit 42.

Thus, fluid is introduced into actuator 30 by way of conduit 42 to overcome the spring and release the brakes. The service brakes are actuated by means of service brake valve 26 which is operative to introduce pressurized fluid by way of line 28 to act on a piston within actuator 30 and apply the brakes or bias them into the engaged position.

An interconnection between the transmission control system and the brake control system is accomplished by means of an interlock valve 46 which is interconnected by means of conduits 42 and conduit 48 between the two systems. The conduit means 42 communicates between actuator 30 and the valve 46, and conduit means 48 communicates between transmission control supply line 22 and the valve 46.

A second source of pressurized fluid comprising a ground-driven pump 50, that is, a pump that is driven by the wheels of the vehicle when the vehicle is in motion, which supplies fluid by way of conduit 52 to valve 46. A suitable relief valve 54 is provided to protect the system. A return line 56 communicates fluid from valve 46 to the tank or reservoir 12. Suitable operator control means, such as a lever 58, is provided for shifting the valve 46 manually to selected positions.

Figure 2:
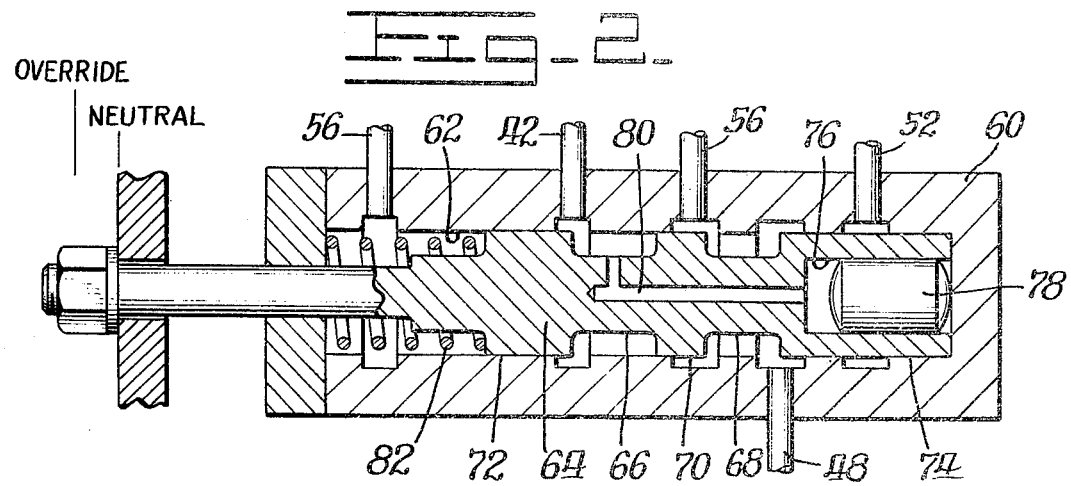
FIG. 2 is a sectional view of the interlock valve of the present invention in a first position of operation.

Turning now to FIG. 2, the valve 46 is shown in section as comprising a housing 60 which is formed with a cylindrical bore 62 having a spool 64 reciprocally mounted therein. A plurality of conduits communicate in various points along the bore 62 as indicated. The valve spool itself comprises a generally cylindrical body having a pair of grooves 66, 68 formed therein, separated by a land 70 and including lands 72 and 74 at each end thereof. The spool 64 is provided with a cylindrical bore 76 at one end therein, in which is reciprocally mounted a piston 78. A passageway 80 communicates between one end of the bore 76 and with annular groove 66. A spring 84 is mounted within one end of the housing 60 and operatively engages one end of the spool 64 to bias it in the rightward position as shown in FIG. 2.

The valve in FIG. 2 is illustrated in its neutral position which it would assume when the vehicle is parked. With the valve in this position, conduit 48, which communicates with the transmission control supply line, is in open communication by way of annular groove 68 with return line 56 to thereby vent the transmission control system. Thus, pressure from the transmission control system that would be necessary for making the transmission operative would be vented so that the machine cannot be moved until the pressure is built up within the control system.

Figure 3:
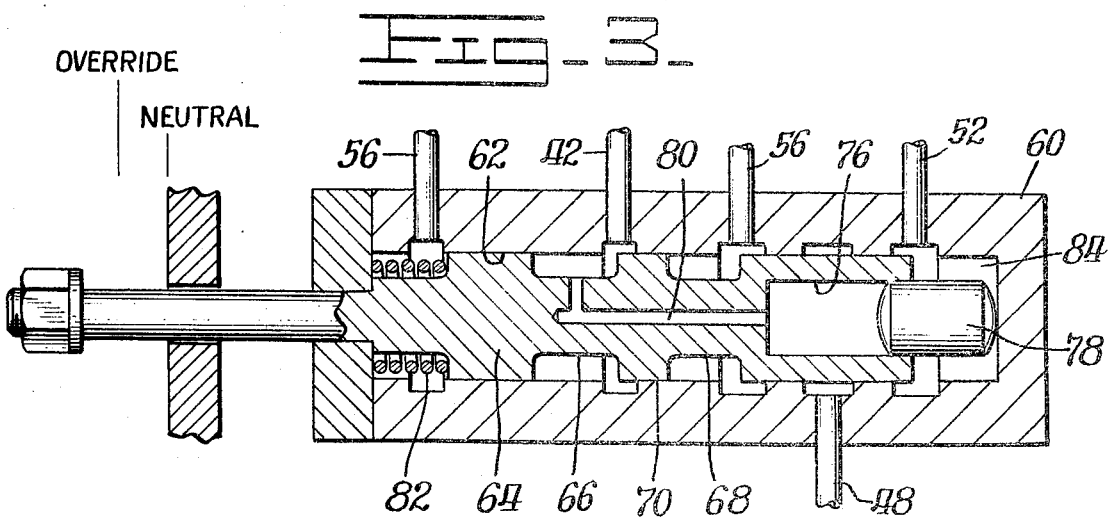
FIG. 3 is a view like FIG. 2 of the interlock valve in a second position of operation.

The parking brake is released by shifting on-off valve 40 to communicate accumulator pressure from accumulator 20 by way of line 42 to the actuator 30. Pressure in line 42 is also communicated to valve 46 and by way of annular groove 66 to passageway 80, where it communicates with bore 76 and the end of piston 78 to thereby shift the valve 64 to the leftward position as shown in FIG. 3. In this position communication between conduits 48 and 56 is blocked, and thus, pressure is permitted to build up in transmission control line 22 so that the machine can be operated.

With the spool 64 in the position shown in FIG. 3, pressure is available from ground-driven pump 50 by way of line 52 to chamber 84 at right-hand end of spool 64 to prevent the venting of the transmission in case of failure of the brake lines or similar means. This will allow the operator of the vehicle to maintain control of the machine until he reaches a place that he can safely stop the machine. As soon as he stops, pressure in chamber 84 will bleed down and spool 64 will move to the right and again vent the transmission to prevent further movement of the machine.

Figure 4:
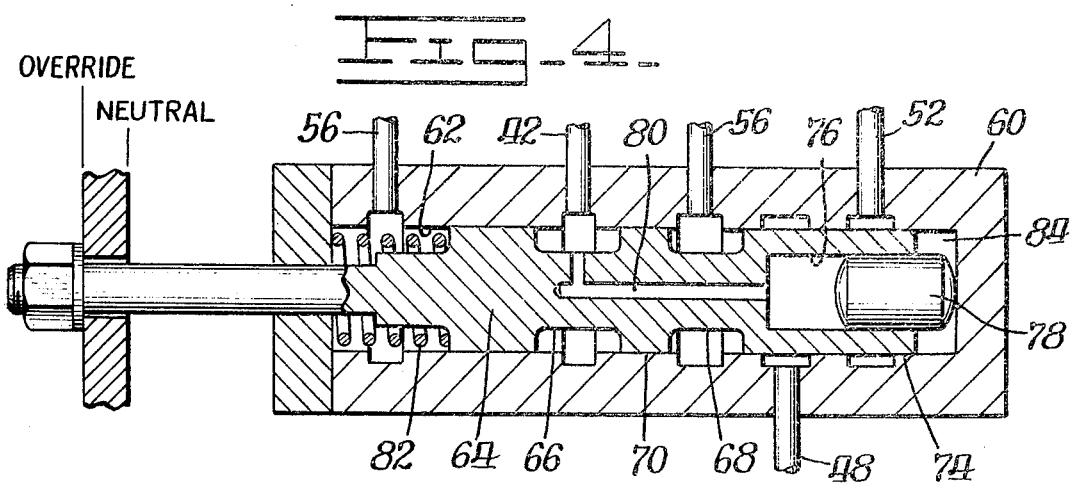
FIG. 4 is a view like FIG. 2 of the interlock valve in a third position of operation.

If it becomes necessary to move the machine to a service area for repair, spool 64 can be manually shifted to the position as shown in FIG. 4 to block venting of the transmission to the override position. This will allow pressure to be maintained in the pressure supply line 22 so that the transmission can be used to move the machine. As best shown in FIG. 4, the override position will not allow spool 64 to move sufficiently to the left to allow fluid pressure from the ground-driven pump into chamber 84.

While the invention has been described with respect to a single embodiment, it is to be understood that numerous changes and modifications may be made therein without departing from the spirit and scope of the invention as defined in the appended claims.

I claim:
1. In a vehicle the combination of an engine driven hydraulic pump, a hydraulic sump, a transmission control operable by means of fluid supplied by said pump, a brake including a brake actuator which has a double acting piston which is spring biased to normally apply the brake, a parking brake release control for selectively communicating fluid pressure from the pump to the brake actuator to overcome the spring bias thereof to release the brake, a service brake control for selectively communicating fluid to the brake actuator to balance the parking brake release control pressure in the actuator whereby the spring biasing thereof will selectively apply the brake during service operation of the vehicle, and interlock valve means for preventing actuation of the transmission control without releasing the parking brake.

conduit means communicating the interlock valve with the transmission control, the parking brake release control, and to the sump, said interlock valve including spring biased spool means for venting the transmission control to sump while the parking brake control is selected to cut off parking brake release pressure to the brake actuator, and further including means responsive to parking brake release pressure in the brake actuator, to shift the spool means and interrupt communication of the transmission control with the sump, and allow pressure to build up in the transmission control for operation thereof.

2. The invention defined in claim 1 further comprising a ground driven hydraulic pump arranged to communicate fluid pressure to the interlock valve when the vehicle is in motion, and wherein said interlock valve includes means for maintaining the spool means shifted against said spring bias while the ground driven hydraulic pump communicates fluid pressure to the interlock valve, whereby the transmission control will not be disabled while the vehicle is in motion upon loss of brake actuating pressure.

3. The invention defined in claim 1 further comprising manual control means for manually shifting said spool means against the spring bias thereof to selectively maintain transmission control pressure.

* * * * *